US012691429B2

(12) United States Patent
Son et al.

(10) Patent No.:  US 12,691,429 B2
(45) Date of Patent:       Jul. 28, 2026

(54) FLUIDIZED BED REACTOR AND METHOD FOR RECOVERING ACTIVE METAL OF LITHIUM SECONDARY BATTERY UTILIZING SAME

(71) Applicant: SK INNOVATION CO., LTD., Seoul (KR)

(72) Inventors: Sung Real Son, Daejeon (KR); Min Ji Sung, Daejeon (KR); Choon Hwan Song, Daejeon (KR); Ji Min Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 968 days.

(21) Appl. No.: 17/849,974

(22) Filed: Jun. 27, 2022

(65) Prior Publication Data

US 2022/0395794 A1      Dec. 15, 2022

Related U.S. Application Data

(63) Continuation of application No. PCT/KR2020/017503, filed on Dec. 3, 2020.

(30) Foreign Application Priority Data

Dec. 27, 2019     (KR) ........................ 10-2019-0176051

(51) Int. Cl.
B01J 8/44          (2006.01)
B01J 8/18          (2006.01)
(Continued)

(52) U.S. Cl.
CPC .............. B01J 8/44 (2013.01); B01J 8/1827 (2013.01); B01J 8/1872 (2013.01); B01J 8/24 (2013.01);
(Continued)

(58) Field of Classification Search
CPC . B01J 8/44; B01J 8/1827; B01J 8/1872; B01J 2208/00893; B01J 2208/00902; B01J 2208/00938; B01J 2208/0092
See application file for complete search history.

(56) References Cited

U.S. PATENT DOCUMENTS 3,215,508 A * 11/1965 Piester ................... C07C 17/15
                                                       570/224
3,915,657 A * 10/1975 Staffin ................... B01J 8/1827
                                                       34/582

(Continued)

FOREIGN PATENT DOCUMENTS

CN        201168597 Y     12/2008
CN        103047644 A      4/2013
(Continued)

OTHER PUBLICATIONS

The extended European search report For EP 20907225.5 issued on Mar. 15, 2023 from European patent office in a counterpart European patent application.
(Continued)

*Primary Examiner* — Lessanework Seifu
(74) *Attorney, Agent, or Firm* — The PL Law Group, PLLC

(57)          ABSTRACT

A fluidized bed reactor according to an embodiment of the present disclosure includes a reactor body, and a dispersion plate coupled to a bottom portion of the reactor body. The dispersion plate may include a base plate and injection columns protruding from a top surface of the base plate. The injection columns include first injection columns arranged at a central portion of the dispersion plate, and second injection columns arranged at a peripheral portion of the dispersion plate. The second injection column has a greater height than a height of the first injection column. A reactive gas is uniformly injected to a wall surface of the reactor through
(Continued)

the dispersion plate, thereby increasing a recovery ratio for an active metal of a lithium secondary battery.

3 Claims, 4 Drawing Sheets

(51) Int. Cl.

| | | |
|---|---|---|
| *B01J 8/24* | (2006.01) | |
| *H01M 10/54* | (2006.01) | |

(52) U.S. Cl.

CPC .... *H01M 10/54* (2013.01); *B01J 2208/00902* (2013.01); *B01J 2208/00938* (2013.01)

(56) References Cited

U.S. PATENT DOCUMENTS

| | | | | |
|---|---|---|---|---|
| 4,429,471 | A | * | 2/1984 | Goodstine .............. B01J 8/1818 |
| | | | | 239/557 |
| 4,841,884 | A | * | 6/1989 | Engstrom ............... F23C 10/20 |
| | | | | 431/170 |
| 9,333,476 | B2 | | 5/2016 | Campanella et al. |
| 9,393,514 | B2 | | 7/2016 | Suda |
| 10,392,258 | B2 | | 8/2019 | Song |
| 2011/0073022 | A1 | | 3/2011 | Maryamchik et al. |

FOREIGN PATENT DOCUMENTS

| | | | | | |
|---|---|---|---|---|---|
| CN | 107438479 | A | | 12/2017 | |
| GB | 2085748 | A | * | 5/1982 | ................ C10J 3/56 |
| JP | 2722969 | B2 | | 3/1998 | |
| JP | 2012-201851 | A | | 10/2012 | |
| JP | 2019-156737 | A | | 9/2019 | |
| KR | 10-0725001 | B1 | | 6/2007 | |
| KR | 10-0843601 | B1 | | 7/2008 | |
| KR | 10-2010-0079383 | A | | 7/2010 | |
| KR | 10-2014-0124457 | A | | 10/2014 | |
| KR | 10-1488705 | B1 | | 2/2015 | |
| KR | 10-1544637 | B1 | | 8/2015 | |
| KR | 10-1784043 | B1 | | 10/2017 | |
| KR | 10-2020238 | B1 | | 9/2019 | |
| WO | WO 2007/129845 | A1 | | 11/2007 | |
| WO | WO 2014/180693 | A1 | | 11/2014 | |
| WO | WO 2018/196997 | A1 | | 11/2018 | |

OTHER PUBLICATIONS

International Search Report for PCT/KR2020/017503 mailed on Mar. 10, 2021.

European Search Report For EP 20907225.5 issued on Jan. 5, 2023 from European patent office in a counterpart European patent application.

Notice of allowance issued on May 20, 2025 from Korean Patent Office in a counterpart Korean Patent Application No. 10-2019-0176051 (all the cited references are listed in this IDS.) (English translation is also submitted herewith.).

Office action issued on Dec. 27, 2023 from China Patent Office in a counterpart Chinese Patent Application No. 202080090214.6 (all the cited references are listed in this IDS.) (English translation is also submitted herewith.).

* cited by examiner

FLUIDIZED BED REACTOR AND METHOD FOR RECOVERING ACTIVE METAL OF LITHIUM SECONDARY BATTERY UTILIZING SAME

CROSS-REFERENCE TO RELATED APPLICATION AND CLAIM OF PRIORITY

The present application is a continuation application to International Application No. PCT/KR2020/017503 with an International Filing Date of Dec. 3, 2020, which claims the benefit of Korean Patent Application No. 10-2019-0176051 filed on Dec. 27, 2019, at the Korean Intellectual Property Office, the disclosures of which are incorporated by reference herein in their entirety.

BACKGROUND

1. Field

The present invention relates to a fluidized bed reactor and a method of recovering an active metal of a lithium secondary battery using the same. More particularly, the present invention relates to a fluidized bed reactor including a dispersion plate and a method for recovering an active metal of a lithium secondary battery using the same.

2. Description of the Related Art

Recently, a secondary battery has been widely employed as a power source of a mobile electronic device such as a camcorder, a mobile phone, a laptop computer, etc., and a vehicle such as an electric vehicle, a hybrid vehicle, etc. A lithium secondary battery is highlighted among the secondary battery due to advantages such as high operational voltage and energy density per unit weight, a high charging rate, a compact dimension, etc.

A lithium metal oxide may be used as an active material for a cathode of the lithium secondary battery. The lithium metal oxide may further contain a transition metal such as nickel, cobalt, manganese, etc.

As the above-mentioned high-cost valuable metals are used for the cathode active material, 20% or more of a production manufacturing cost is required for manufacturing the cathode material. Additionally, as environment protection issues have recently been highlighted, a recycling method of the cathode active material is being researched.

Conventionally, a method of sequentially recovering the valuable metals by leaching a waste cathode active material in a strong acid such as sulfuric acid has been used, but the wet process may be disadvantageous in aspect of a regeneration selectivity and a regeneration time, and may cause environmental pollution. Therefore, a method for recovering the valuable metals using a dry-based reaction through a contact with a reactive gas is being researched.

However, as a size of the active material particles supplied for a dry reaction becomes decreased, a non-uniform reaction may occur due to an aggregation. Further, a recovery ratio of the active material may be reduced due to a local non-uniform supply of a reactive gas in a reactor.

For example, Korean Registered Patent Publication No. 10-0709268 discloses an apparatus and a method for recycling a waste manganese battery and an alkaline battery, but does not provide a dry-based method for regenerating valuable metals with high selectivity and high yield.

SUMMARY

According to an aspect of the present invention, there is provided a fluidized bed reactor having improved reaction efficiency and reliability.

According to an aspect of the present invention, there is provided a method of recovering an active metal of a lithium secondary battery using the fluidized bed reactor.

A fluidized bed reactor according to embodiments of the present invention includes a reactor body, and a dispersion plate coupled to a bottom portion of the reactor body, the dispersion plate including a base plate and injection columns protruding from a top surface of the base plate. The injection columns include first injection columns arranged at a central portion of the dispersion plate, and second injection columns arranged at a peripheral portion of the dispersion plate, the second injection columns having a greater height than a height of the first injection columns.

In some embodiments, the first injection column may include a first column body extending from the top surface of the base plate, a first cap portion covering an upper portion of the first column body, and a first injection hole penetrating through the first column body. The second injection column may include a second column body extending from the top surface of the base plate, a second cap portion covering an upper portion of the second column body, and a second injection hole penetrating through the second column body.

In some embodiments, the first injection hole and the second injection hole may be inclined toward the top surface of the base plate.

In some embodiments, a height of the second injection hole may be greater than a height of the first injection hole.

In some embodiments, the height of the second injection hole may be adjusted so that a straight line in an inclined direction of the second injection hole may contact a wall surface of the reactor body.

In some embodiments, the second injection hole may include an upper injection hole and a lower injection hole, and a height of the upper injection hole may be greater than a height of the first injection hole.

In some embodiments, the upper injection hole and the lower injection hole may be inclined toward the base plate.

In some embodiments, the upper injection hole may be inclined toward the base plate, and the lower injection hole may be inclined from the base plate toward a top portion of the reactor body.

In some embodiments, the injection columns may be arranged in a constant pitch or in a constant grid shape.

In some embodiments, the fluidized bed reactor may further include a reactive gas flow path for supplying a reactive gas from a portion of the reactor body under the base plate.

In a method of recovering an active metal of a lithium secondary battery according to embodiments of the present invention, a waste cathode active material mixture obtained from a waste cathode of a lithium secondary battery is prepared. The waste cathode active material mixture is reacted in the fluidized bed reactor of embodiments as described above to form a preliminary precursor mixture. A lithium precursor is selectively recovered from the preliminary precursor mixture.

In some embodiments, in the forming of the preliminary precursor mixture, a reactive gas may be ejected through the injection columns included in the dispersion plate of the fluidized bed reactor.

In some embodiments, the reactive gas may include hydrogen.

In some embodiments, the preliminary precursor mixture may include preliminary lithium precursor particles and transition metal-containing particles.

In some embodiments, the preliminary lithium precursor particles may include at least one of lithium hydroxide, lithium oxide and lithium carbonate.

In some embodiments, in the recovering of the lithium precursor, the preliminary lithium precursor particles may be washed with water.

According to the above-described exemplary embodiments, a dispersion plate may be disposed at a bottom portion of a fluidized bed reactor to promote diffusion and uniform dispersion of a reactive gas. The dispersion plate may include injection columns protruding from a base plate and including an injection flow path, and a higher injection column may be disposed at a peripheral portion of the base plate.

Accordingly, generation of a dead zone in which the reactive gas may not reach may be prevented on an inner wall of the reactor and a surface of the base plate, and uniform reaction zone and fluidized bed may be formed.

The fluidized bed reactor according to exemplary embodiments may be utilized in a recycling process by a hydrogen reduction of a cathode active material of a lithium secondary battery. Aggregation of active material particles may be suppressed by the dispersion plate, and an active material recovery efficiency may be increased by the formation of a uniform reaction fluidized bed.

DETAILED DESCRIPTION OF THE EMBODIMENTS

Embodiments of the present invention provide a fluidized bed reactor capable of forming an entirely uniform reaction area and a fluidized bed by using a dispersion plate. Further, embodiments of the present invention provide a dry-based, high-purity, high-yield method of recovering an active metal from a lithium secondary battery using the fluidized bed reactor.

Hereinafter, embodiments of the present invention will be described in detail with reference to the accompanying drawings. However, the embodiments are provided as examples and the present invention is not limited to the specific embodiments described herein.

As used herein, the term "precursor" is used to comprehensively refer to a compound including a specific metal to provide the specific metal included in an electrode active material.

Figure 1:
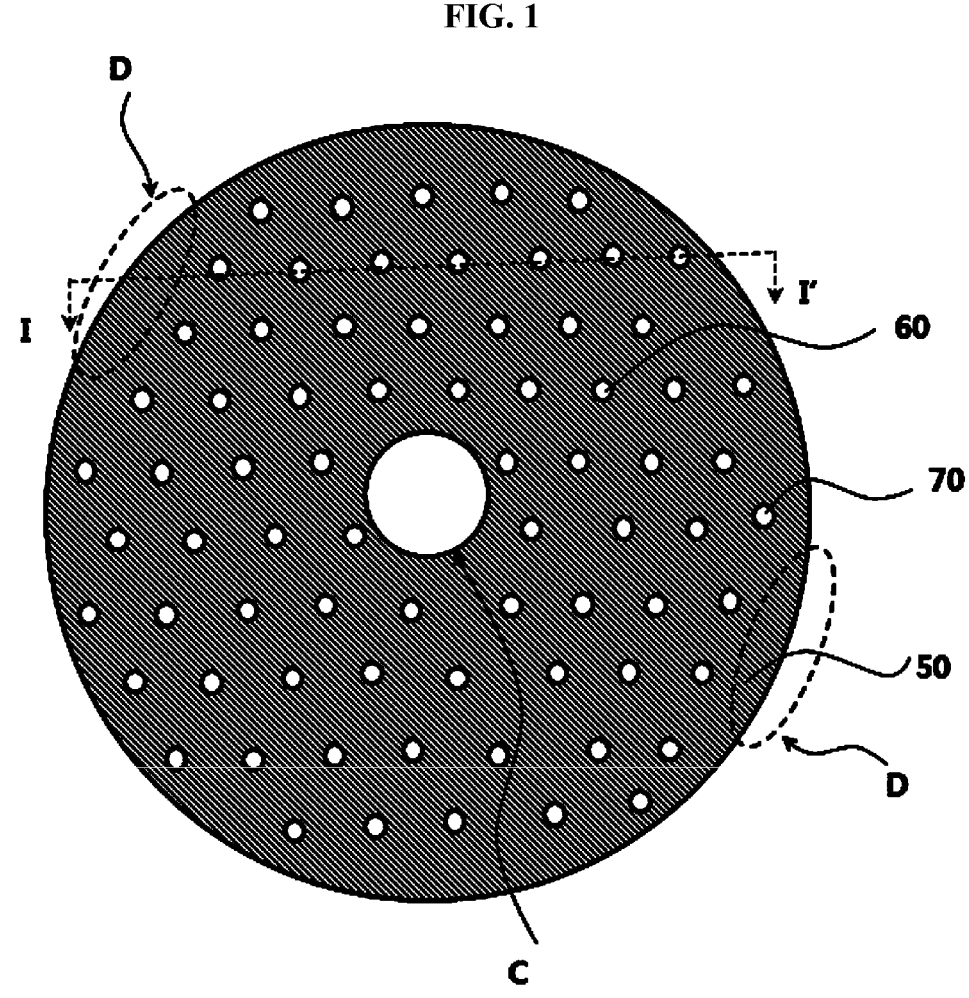
FIG. 1 is a schematic top plan view illustrating a dispersion plate of a fluidized bed reactor in accordance with exemplary embodiments.
Figure 2:
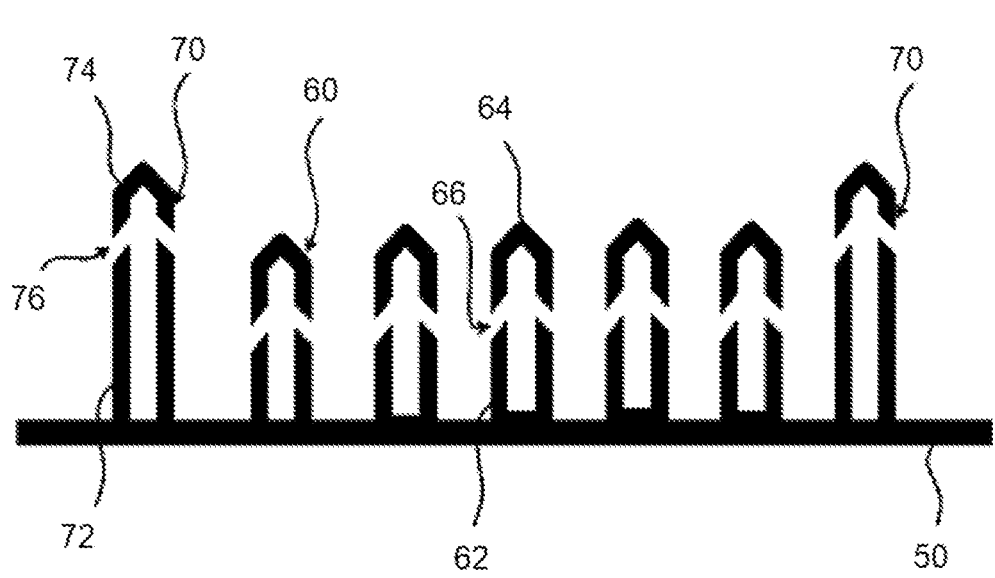
FIG. 2 is a schematic cross-sectional view illustrating a construction of injection columns of a dispersion plate in accordance with exemplary embodiments.

FIG. 1 is a schematic top plan view illustrating a dispersion plate of a fluidized bed reactor in accordance with exemplary embodiments. FIG. 2 is a schematic cross-sectional view illustrating a construction of injection columns of a dispersion plate in accordance with exemplary embodiments. For example, FIG. 2 is a cross-sectional view taken along line I-I' of FIG. 1.

Referring to FIGS. 1 and 2, a dispersion plate may include a base plate 50 and a plurality of injection columns 60 and 70 protruding from the base plate 50.

The base plate 50 may be, e.g., a circular or polygonal plate formed of a metal or ceramic material.

The injection columns 60 and 70 may have a shape protruding from a top surface of the base plate 50. The injection columns 60 and 70 may be regularly arranged with a constant arrangement (e.g., a constant grid arrangement) and an arrangement pitch on the top surface of the base plate 50 for a uniform diffusion and distribution of a reactive gas.

For example, the injection columns 60 and 70 may have an array shape or a grid shape disposed at vertices of a polygon such as a triangle, a square or a hexagon. As illustrated in FIG. 1, the injection columns 60 and 70 may be arranged, e.g., based on an equilateral triangle pitch.

The injection columns 60 and 70 may include first injection columns 60 disposed within a predetermined radius from a central portion C of the base plate 50 and second injection columns 70 disposed at a peripheral or outer portion of the base plate 50.

As illustrated in FIG. 2, each injection column 60 and 70 may include a column body 62 and 72 and a cap portion 64 and 74. For example, the injection columns 60 and 70 may have a bubble cap or a tuyere structure.

The first injection column 60 may include a first column body 62 and a first cap portion 64 covering an upper portion of the first column body 62. The second injection column 70 may include a first column body 72 and a second cap portion 74 covering an upper portion of the second column body 72.

The first injection column 60 may include a first injection hole 66 passing through the first column body 62. The second injection column 70 may include a second injection hole 76 passing through the second column body 72.

As illustrated in FIG. 2, the first injection hole 66 and the second injection hole 76 may be formed to be inclined toward the base plate 50 from a top of the injection columns 60 and 70. For example, the injection holes 66 and 76 may have a shape extending from the top of the injection columns 60 and 70 toward the base plate 50.

In an embodiment, an inclination angle between a vertical direction from the top surface of the base plate 50 and the injection holes 66 and 76 may be from about 30 to 60°.

The injection holes 66 and 76 are formed to be inclined with respect to the top surface of the base plate 50, so that the reactive gas may be sprayed to diffuse in a direction to the base plate 50. Accordingly, as reactants (e.g., precursor particles or active material particles) that may be settled to the top surface of the base plate 50 may move upwardly, a formation of the fluidized bed may be promoted.

In exemplary embodiments, a height of the second injection column 70 disposed on the peripheral portion of the base plate 50 may be greater than a height of the first injection column 60. Accordingly, a height of the second injection hole 76 may also be greater than a height of the first injection hole 66.

As described above, if the injection columns 60 and 70 are arranged according to a predetermined pitch (e.g., a triangular arrangement) on the base plate 50, an area where the injection columns may not be arranged by the predetermined pitch may be generated on the peripheral or outer portion of the base plate 50. Accordingly, as indicated by a dotted ellipse in FIG. 1, a dead zone D in which the reactive gas may not reach may be generated.

In this case, the reactive gas may not reach a wall surface of a reactor body, and a fluidized bed may not be uniformly created. Additionally, aggregated reactant particles may adhere to the wall surface of the reactor body, thereby reducing a reaction yield.

However, according to exemplary embodiments, the second injection columns having a relatively increased height may be disposed on the peripheral portion of the base plate 50 where the dead zone D may be easily generated. Thus, an injection distance and an injection height of the reactive gas may be increased in the peripheral portion.

Accordingly, the reactive gas may reach the wall surface of the reactor body to prevent stagnation and agglomeration of the reactant particles, thereby promoting the formation of the fluidized bed. Further, the dead zone D may be substantially reduced or removed at the periphery portion indicated in FIG. 1.

In a central portion C of the dispersion plate shown of FIG. 1, a supporter or the injection column of the dispersion plate may be disposed. For example, the first injection columns 60 may also be arranged in the central portion C, and the first injection columns 60 may be arranged to a predetermined distance in a radial direction from the central portion C as described above.

Figure 3:
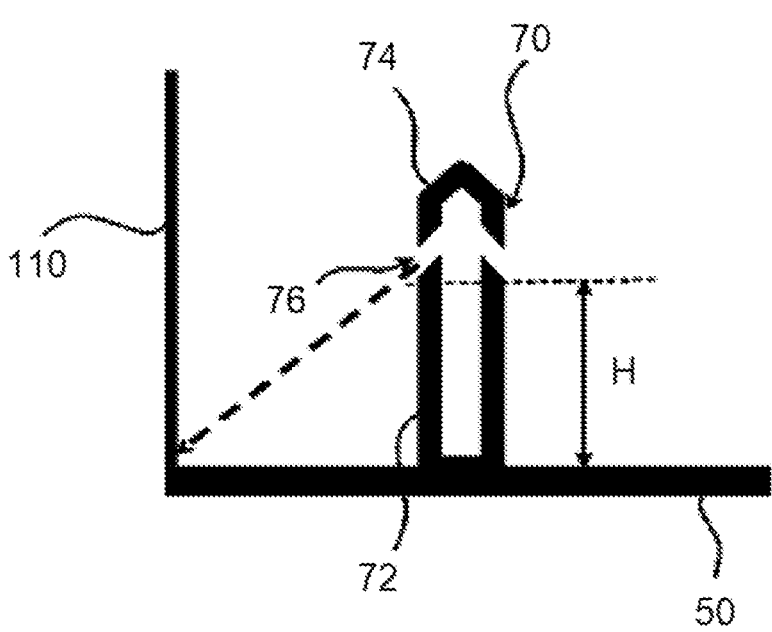
FIG. 3 is a schematic cross-sectional view for describing a construction of a second injection column in accordance with exemplary embodiments.

FIG. 3 is a schematic cross-sectional view for describing a construction of a second injection column in accordance with exemplary embodiments.

Referring to FIG. 3, in the second injection column 70, a height H of the second injection hole 76 may be adjusted so that the reactive gas may contact the wall surface of the reactor body 110.

For example, a minimum height of the second injection hole 76 may be a height at which a straight line extending from the second injection hole 76 can reach the lowest point of the reactor body 110.

Figure 4:
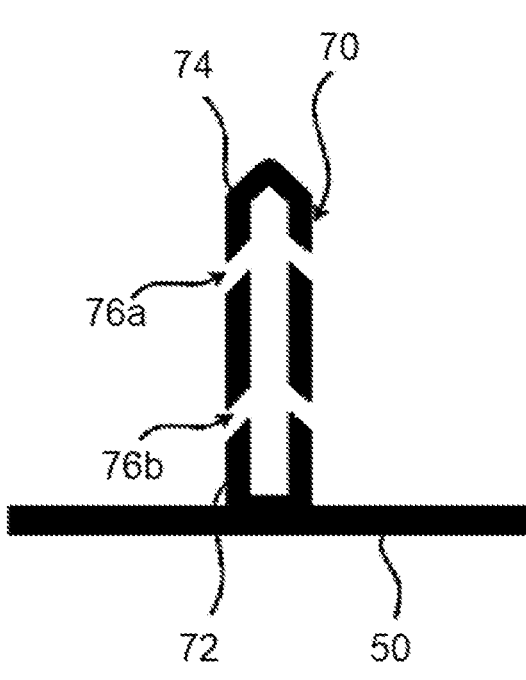
FIGS. 4 and 5 are schematic cross-sectional views illustrating a construction of a second injection column of a dispersion plate in accordance with some exemplary embodiments.
Figure 5:
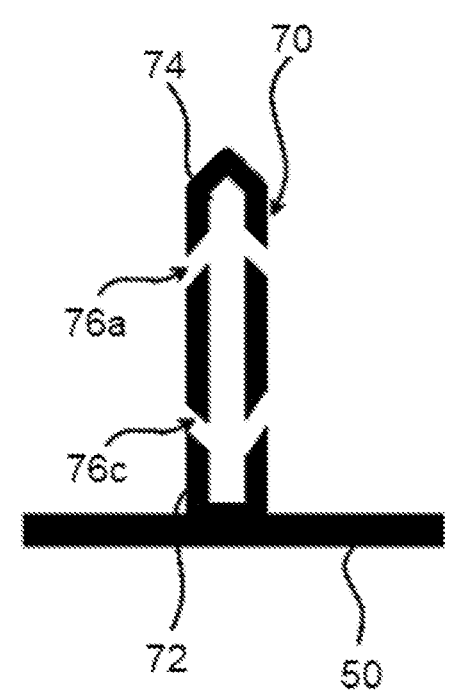

FIGS. 4 and 5 are schematic cross-sectional views illustrating a construction of a second injection column of a dispersion plate in accordance with some exemplary embodiments.

Referring to FIGS. 4 and 5, the second injection column 70 may include a plurality of injection holes located at different heights.

As illustrated in FIG. 4, the second injection column 50 may include an upper injection hole 76a and a lower injection hole 76b. In some embodiments, a height of the upper injection hole 76a may be set such that a straight line in an injection direction may contact the wall surface of the reactor body, as described with reference to FIG. 3. The height of the upper injection hole 76a may be greater than a height of the first injection hole 66 of the first injection column 60.

The lower injection hole 76b may be added to the second injection column 70, so that the reactive gas may be additionally provided into the dead zone D indicated in FIG. 1. Accordingly, effects of preventing particle stagnant/aggregation on the wall surface of the reactor body 110 through the upper injection hole 76a and reducing/removing the dead zone D through the lower injection hole 76b may be implemented together.

As illustrated in FIG. 5, a lower injection hole 76c may be inclined upwardly. For example, the lower injection hole 76c may extend from the base plate 50 toward a top portion of the reactor body 110. In this case, a rising action of the fluidized bed may be promoted through the lower injection hole 76c.

Figure 6:
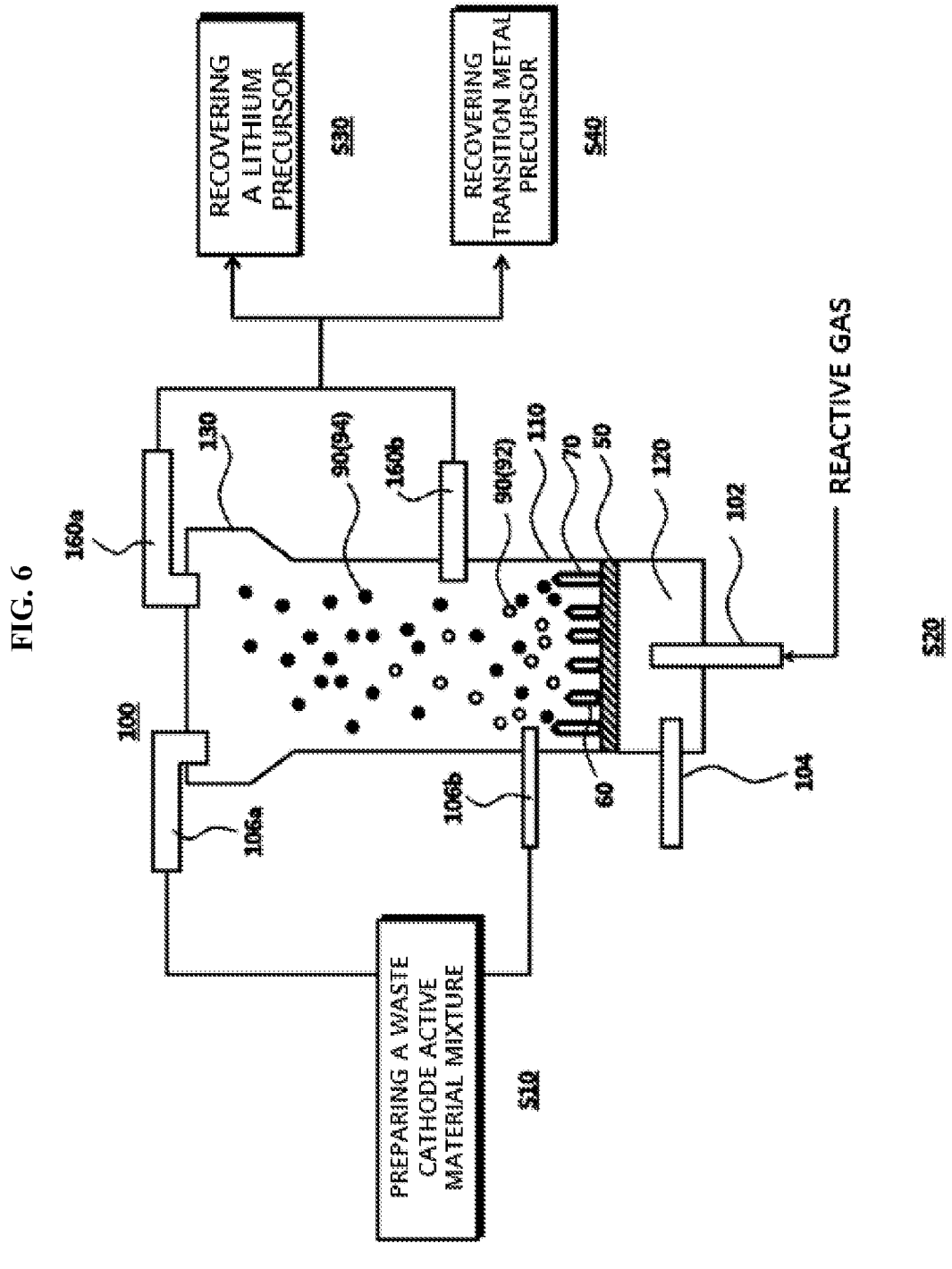
FIG. 6 is a schematic diagram for describing a fluidized bed reactor and a method of recovering an active metal of a lithium secondary battery utilizing the same in accordance with exemplary embodiments.

FIG. 6 is a schematic diagram for describing a fluidized bed reactor and a method of recovering an active metal of a lithium secondary battery utilizing the same in accordance with exemplary embodiments.

Hereinafter, a method of recovering an active metal of a lithium secondary battery and constructions/structures of a fluidized bed reactor including the above-described dispersion plate will be described together with reference to FIG. 6.

Referring to FIG. 6, a waste cathode active material mixture may be prepared from a waste cathode of a lithium secondary battery (e.g., in a process of S10).

The lithium secondary battery may include an electrode assembly including a cathode, an anode, and a separation layer interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may include a compound represented by Chemical Formula 1 below.

$$Li_xM1_aM2_bM3_cO_y \qquad \text{[Chemical Formula 1]}$$

In Chemical Formula 1, M1, M2 and M3 may each be a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese.

The waste cathode may be recovered by separating the cathode from the waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene and carbon nanotube. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In exemplary embodiments, the recovered waste cathode may be pulverized to produce a waste cathode active material mixture. Accordingly, the waste cathode active material mixture may be prepared in a powder form. As described above, the waste cathode active material mixture may include a powder of the lithium-transition metal oxide, e.g., a powder of the NCM-based lithium oxide (e.g., Li(NCM)O₂).

The term "waste cathode active material mixture" used in the present application may refer to a raw material that is input to a fluidized bed reaction treatment to be described later after the cathode current collector is substantially removed from the waste cathode. In an embodiment, the waste cathode active material mixture may include cathode active material particles such as the NCM-based lithium oxide. In an embodiment, the waste cathode active material mixture may include portions of components derived from the binder or the conductive material. In an embodiment, the waste cathode active material mixture may substantially consist of the cathode active material particles.

In some embodiments, an average particle diameter (D50) of the waste cathode active material mixture may be from 5 to 100 μm. Within the above range, a lithium-transition metal oxide such as $Li(NCM)O_2$ to be recovered may be easily separated from the cathode current collector, the conductive material and the binder included in the waste cathode active material mixture.

In some embodiments, the waste cathode active material mixture may be heat-treated before being input into a fluidized bed reactor to be described later. Impurities such as the conductive material and the binder included in the waste cathode active material mixture may be substantially removed or reduced by the heat treatment, so that the lithium-transition metal oxide may be introduced into the fluidized bed reactor with high purity A temperature of the heat treatment temperature may be, e.g., from about 100 to 500° C., preferably from about 350 to 450° C. Within the above range, the impurities may be substantially removed while preventing decomposition and damages of the lithium-transition metal oxide.

For example, in a process of S20, the waste cathode active material mixture may be reacted in a fluidized bed reactor 100 to form a preliminary precursor mixture 90.

As illustrated in FIG. 6, the fluidized bed reactor 100 may be divided into a reactor body 110, a lower reactor portion 120 and an upper reactor portion 130. The reactor body 110 may include or may be integrated with a heating tool such as a heater.

The dispersion plate described above may be coupled to a bottom portion of the reactor body 110. Accordingly, a lower portion under the dispersion plate in the reactor body 110 may be defined as the lower reactor portion 120.

The waste cathode active material mixture may be supplied into the reactor body 110 through supply flow paths 106a and 106b. The waste cathode active material mixture may be dropped through a first supply flow path 106a connected to the upper reactor portion 130, or may be introduced through a second supply flow path 106b connected to the lower reactor portion 110. In an embodiment, the first and second supply flow paths 106a and 106b may be used together to supply the waste cathode active material mixture.

A reactive gas for converting the waste cathode active material mixture into a preliminary precursor may be supplied into the reactor body 110 through a reactive gas flow path 102 connected to the lower reactor portion 120. In some embodiments, the reactive gas may include a reductive gas. For example, hydrogen ($H_2$) may be supplied.

The reactive gas may be discharged into the reactor body 110 through the injection columns 60 and 70 included in the dispersion plate. The reactive gas may be supplied from the bottom portion of the fluidized bed reactor 100 to be in contact with the waste cathode active material mixture, so that the waste cathode active material mixture may react with the reactive gas while moving to the upper reactor portion 130 to be converted into the preliminary precursor.

In some embodiments, the lithium-transition metal oxide may be reduced by the hydrogen gas to generate a preliminary lithium precursor including, e.g., lithium hydroxide (LiOH), lithium oxide (e.g., $Li_2O$), and a transition metal or a transition metal oxide. For example, Ni, Co, NiO, CoO and MnO may be produced together with the preliminary lithium precursor by the reductive reaction.

The reductive reaction in the reactor body 110 may be performed at a temperature from about 400 to 700° C., preferably from 450 to 550° C. Within the reaction temperature range, the reductive reaction may be promoted without causing re-aggregation and recombination of the preliminary lithium precursor and the transition metal/transition metal oxide.

In some embodiments, a carrier gas may be supplied together with the reactive gas from the lower reactor portion 120 through a carrier gas flow path 104. For example, the carrier gas may include an inert gas such as nitrogen (N2) or argon (Ar). The carrier gas may also be discharged and supplied through the injection columns 60 and 70 of the dispersion plate to promote the fluidized bed formation. For example, a cyclone formation through the carrier gas may be promoted.

A preliminary precursor mixture 90 including preliminary lithium precursor particles 94 and transition metal-containing particles 92 (e.g., the transition metal or the transition metal oxide) may be formed in the reactor body 130. The preliminary lithium precursor particles 94 may include, e.g., lithium hydroxide, lithium oxide and/or lithium carbonate.

In an embodiment, the transition metal-containing particles 92 including nickel, cobalt or manganese may be relatively heavier than the preliminary lithium precursor particles 94, so that the preliminary lithium precursor particles 94 may be collected through outlets 160a and 160b in advance.

In an embodiment, the preliminary lithium precursor particles 94 may be discharged through a first outlet 160a connected to the upper reactor portion 130. In this case, a selective recovery of the preliminary lithium precursor particles 94 according to a weight gradient may be promoted.

In an embodiment, the preliminary precursor mixture 90 including the preliminary lithium precursor particles 94 and the transition metal-containing particles 92 may be collected through a second outlet 160b connected to the reactor body 130. In this case, the preliminary precursor mixture 90 may be directly recovered from a fluidized bed forming region to increase a production yield.

In an embodiment, the preliminary precursor mixture 90 may be collected together through the first and second outlets 160a and 160b.

According to the above-described exemplary embodiments, the supply of the reactive gas to the preliminary precursor mixture 90 aggerated or stagnated on the wall surface of the reactor body 110 may be facilitated through the second injection column 70 disposed on the peripheral portion of the dispersion plate 50, so that the formation of the fluidized bed may be uniformly expanded.

Thus, an overall reaction area in the reactor body 110 may be increased to improve a reaction yield.

The preliminary lithium precursor particles 94 collected through the outlets 160a and 160b may be recovered as a lithium precursor (e.g., in a process of S30).

In some embodiments, the preliminary lithium precursor particles 94 may be washed with water. The preliminary lithium precursor particles in the form of lithium hydroxide (LiOH) may be substantially dissolved in water by the washing treatment, separated from the transition metal precursor, and recovered in advance. The lithium precursor substantially consisting of lithium hydroxide may be obtained through a crystallization process, etc., of lithium hydroxide dissolved in water.

In an embodiment, the preliminary lithium precursor particles in the form of lithium oxide and lithium carbonate may be substantially removed through the washing treatment. In an embodiment, the preliminary lithium precursor particles in the form of lithium oxide and lithium carbonate may be at least partially converted into lithium hydroxide through the washing treatment.

In some embodiments, the preliminary lithium precursor particles 94 may be reacted with a carbon-containing gas such as carbon monoxide (CO), carbon dioxide ($CO_2$), etc., to obtain lithium carbonate (e.g., $Li_2CO_3$) as the lithium precursor. A crystallized lithium precursor may be obtained through the reaction with the carbon-containing gas. For example, lithium carbonate may be collected by injecting the carbon-containing gas together during the washing treatment.

In some embodiments, a transition metal precursor may be obtained from the collected transition metal-containing particles 92 (e.g., in a process of S40).

For example, the preliminary lithium precursor particles 94 may be collected through the outlets 160a and 160b, and then the transition metal-containing particles 92 may be recovered. Thereafter, the transition metal-containing particles 92 may be treated with an acid solution to form precursors in the form of acid salts of each transition metal.

In an embodiment, sulfuric acid may be used as the acid solution. In this case, $NiSO_4$, $MnSO_4$ and $CoSO_4$ may each be recovered as the transition metal precursor.

As described above, the lithium precursor may be collected through a dry process, and then the transition metal precursors may be selectively extracted using the acid solution, so that purity and selectivity of each metal precursor may be improved, and a load of the wet process may be reduced, and amount of wastewater and by-products may also be reduced.

What is claimed is:

1. A fluidized bed reactor, comprising:
a reactor body; and
a dispersion plate coupled to a bottom portion of the reactor body, the dispersion plate comprising a base plate and injection columns protruding from a top surface of the base plate;
wherein the injection columns comprise:
first injection columns arranged at a central portion of the dispersion plate; and
second injection columns arranged at a peripheral portion of the dispersion plate, the second injection columns having a greater height than a height of the first injection columns,
wherein the first injection column comprises a first column body extending from the top surface of the base plate, a first cap portion covering an upper portion of the first column body, and a first injection hole penetrating through the first column body, and
the second injection column comprises a second column body extending from the top surface of the base plate, a second cap portion covering an upper portion of the second column body, and a second injection hole penetrating through the second column body,
wherein the second injection hole comprises an upper injection hole and a lower injection hole, and a height of the upper injection hole is greater than a height of the first injection hole,
wherein the upper injection hole is inclined toward the base plate, and the lower injection hole is inclined from the base plate toward a top portion of the reactor body.

2. The fluidized bed reactor of claim 1, wherein the injection columns are arranged in a constant pitch or in a constant grid shape.

3. The fluidized bed reactor of claim 1, further comprising a reactive gas flow path for supplying a reactive gas from a portion of the reactor body under the base plate.

\* \* \* \* \*